(12) United States Patent
Rosén et al.

(10) Patent No.: US 10,962,040 B2
(45) Date of Patent: Mar. 30, 2021

(54) BOLT ARRANGEMENT, COUPLING ARRANGEMENT AND METHOD TO MOUNT A COUPLING ARRANGEMENT

(71) Applicant: Aktiebolaget SKF, Gothenburg (SE)

(72) Inventors: Erik Rosén, Gaevle (SE); Daniel Lindgren, Svaerdsjoe (SE)

(73) Assignee: Aktiebolaget SKF, Gothenburg (SE)

( * ) Notice: Subject to any disclaimer, the term of this patent is extended or adjusted under 35 U.S.C. 154(b) by 354 days.

(21) Appl. No.: 15/794,850

(22) Filed: Oct. 26, 2017

(65) Prior Publication Data
US 2018/0128301 A1 May 10, 2018

(30) Foreign Application Priority Data

Oct. 26, 2016 (DE) .................... 10 2016 221 116.1

(51) Int. Cl.
| | |
|---|---|
| *F16B 19/02* | (2006.01) |
| *F16B 37/04* | (2006.01) |
| *F16B 35/04* | (2006.01) |
| *F16B 7/02* | (2006.01) |
| *F16B 7/14* | (2006.01) |

(52) U.S. Cl.
CPC ............ *F16B 19/02* (2013.01); *F16B 37/046* (2013.01); *F16B 7/025* (2013.01); *F16B 7/149* (2013.01); *F16B 35/041* (2013.01); *F16B 37/042* (2013.01)

(58) Field of Classification Search
CPC .. F16B 19/02; F16B 7/149; F16B 3/06; F16B 37/042; F16B 37/046; F16B 35/041; F16B 7/025; F16B 5/02; Y10T 403/75
See application file for complete search history.

(56) References Cited

U.S. PATENT DOCUMENTS

| | | | | | |
|---|---|---|---|---|---|
| 1,823,428 | A | * | 9/1931 | Hill ...................... | F16B 13/065 411/80.1 |
| 2,632,355 | A | * | 3/1953 | Becker .................... | F16B 37/02 411/427 |
| 3,298,725 | A | * | 1/1967 | Boteler .................... | F16B 5/02 403/282 |
| 3,414,304 | A | * | 12/1968 | Miller .................... | F16B 29/00 403/408.1 |

(Continued)

FOREIGN PATENT DOCUMENTS

| | | |
|---|---|---|
| CN | 202280748 U | 6/2012 |
| CN | 104235201 A | 12/2014 |
| GB | 2245326 A | 1/1992 |

*Primary Examiner* — Matthew R McMahon
(74) *Attorney, Agent, or Firm* — Garcia-Zamor Intellectual Property Law; Ruy Garcia-Zamor; Bryan Peckjian (57) ABSTRACT

A bolt arrangement may connect at least two mechanical elements. The arrangement may provide a bolt including an outer circumferential peripheral surface extending in a longitudinal direction of the bolt, and a sleeve presenting an outer circumferential peripheral surface and an inner circumferential peripheral surface extending in a longitudinal direction of the sleeve between a first and a second axial end of the sleeve. The inner peripheral surface provides a tapering profile in its longitudinal direction. A portion of the outer peripheral surface of the bolt provides a corresponding tapering profile matching the tapering profile of the inner peripheral surface of the sleeve. The sleeve further provides a portion extending radially outwards at one of the first and second axial ends.

9 Claims, 6 Drawing Sheets

(56) References Cited

U.S. PATENT DOCUMENTS

| | | | | |
|---|---|---|---|---|
| 4,048,898 A * | 9/1977 | Salter | | F16B 5/02 411/44 |
| 4,192,621 A * | 3/1980 | Barth | | F16B 31/043 403/15 |
| 4,326,826 A * | 4/1982 | Bunyan | | F16B 5/02 411/339 |
| 4,448,565 A * | 5/1984 | Peterson | | F16B 5/02 403/408.1 |
| 4,743,138 A | 5/1988 | Goy | | |
| 4,761,860 A * | 8/1988 | Krauss | | A43C 5/00 24/713.6 |
| 5,170,551 A * | 12/1992 | Norberg | | F16B 5/02 29/252 |
| 5,367,774 A * | 11/1994 | Labarre | | A01G 3/02 30/262 |
| 5,484,264 A * | 1/1996 | Karls | | B63H 23/34 416/134 R |
| 5,521,951 A * | 5/1996 | Charnley | | G21O 5/10 376/260 |
| 5,865,070 A * | 2/1999 | Bornhorst | | F16C 3/06 100/257 |
| 6,840,726 B2 * | 1/2005 | Gosling | | B23P 11/022 403/31 |
| 8,057,145 B2 * | 11/2011 | Dolan | | F16B 5/0258 411/57.1 |
| 8,226,320 B2 * | 7/2012 | Steinke | | F16B 35/041 403/371 |
| 8,496,394 B2 * | 7/2013 | Schneider | | F16B 3/06 403/370 |
| 8,920,086 B2 * | 12/2014 | Stecher | | F16B 2/04 411/57.1 |
| 9,482,324 B2 * | 11/2016 | Johnson | | F16D 1/097 |
| 9,562,559 B2 * | 2/2017 | Schomaker | | B64D 45/02 |
| 9,879,706 B2 * | 1/2018 | Bucknell | | F16B 4/004 |
| 10,006,493 B2 * | 6/2018 | Thesing | | F16B 5/02 |
| 10,247,218 B2 * | 4/2019 | Kirchen | | F16B 5/02 |

\* cited by examiner

Fig. 1

Prior Art

BOLT ARRANGEMENT, COUPLING ARRANGEMENT AND METHOD TO MOUNT A COUPLING ARRANGEMENT

CROSS-REFERENCE

This application claims priority to German patent application no. 102016221116.1 filed on Oct. 26, 2016, the contents of which are fully incorporated herein by reference.

TECHNOLOGICAL FIELD

According to a first aspect, the present disclosure relates to a bolt arrangement for connecting at least two mechanical elements. According to a second aspect, the present disclosure relates to a coupling arrangement. According to a third aspect, the present disclosure relates to a method for mounting a coupling arrangement.

BACKGROUND

To mechanically fix separate mechanical elements one can for example make use of bolt arrangements, comprising bolts and nuts. There are several available designs of bolt and nut connections, such as bolts with and without bolt heads, bolts with cylindrical or tapered shanks, bolts with one or several threads etcetera. One example of a bolt arrangement for connecting two separate mechanical elements is a bolt presenting a central tapered shank with external male threads on each side of the shank. In addition, the bolt arrangement presents a sleeve presenting an internal tapered surface in which the bolt is meant to be driven in to and thereby a radial press-fit is created between the corresponding tapered surfaces. This in turn will result in a radial expansion of the sleeve. Two separate mechanical elements can then be fixed together by mounting the bolt arrangement in aligned through-holes of the mechanical elements. By driving up the sleeve on the central shank, i.e. axially displacing the two components relative each other, a radial force will pressurize the surfaces between the bolt, the sleeve and the inner surfaces of the through-holes. This will lead to that the two mechanical elements will be fixed together due to the friction force acting between the components. In addition, to further strengthen the connection, the bolt extends outside each external side of the two through-holes and nuts are connected at the sides via threaded connections between the bolt and the nuts. Thereby the bolt arrangement will result in a very solid and firm connection of the two mechanical elements. To release the connection the nuts have to be released and also the tapered connection between the sleeve and the shank has to be released by driving off the sleeve from the shank. The release of the sleeve from the shank can e.g. be done by introducing a pressurized fluid, e.g. oil, between the mating surfaces. To facilitate the introduction of the oil it is known to make use of a helical groove on the central shank in which the oil can be distributed.

SUMMARY

An object of the present disclosure is to provide an improved bolt and coupling arrangement which provides a reliable and firm connection and which also provides a facilitated and reliable mounting of the bolt arrangement.

The object is achieved by the subject matter as defined in the independent claims. Alternative and preferred embodiments are disclosed in the dependent claims and in the accompanying description.

According to the first aspect, the object is achieved by a bolt arrangement for connecting at least two mechanical elements which comprises, a bolt presenting an outer circumferential peripheral surface extending in a longitudinal direction of the bolt, a sleeve presenting an outer circumferential peripheral surface and an inner circumferential peripheral surface extending in a longitudinal direction of the sleeve between a first and a second axial end of the sleeve, wherein the inner peripheral surface presents at least a tapering profile in its longitudinal direction, and wherein a portion of the outer peripheral surface of the bolt presents a corresponding tapering profile essentially matching the tapering profile of the inner peripheral surface of the sleeve. In addition, the sleeve further presents a portion extending radially outwards at one of the first and second axial ends. In an embodiment, the portion on the sleeve is a flange.

Due to the portion (or flange) on the sleeve at one of its axial ends the mounting operation will be facilitated. It has namely been realized that in prior art bolt arrangements there may be situations when the sleeve is not positioned correctly relative the hole in which the bolt arrangement is meant to be located. Most often the bolt arrangement is mounted and positioned in its hole by using hand force and if this procedure is done carelessly it can lead to that the hole and the sleeve are not positioned correctly relative each other. With the new proposed design of the sleeve this can be avoided and therefore the bolt arrangement will be correctly mounted at all times. In addition, the mounting procedure will be done by fewer steps, and with fewer tools, and hence the time for mounting the bolt arrangement will be reduced.

During the mounting operation a tensioner may pull the bolt into (expanding) the sleeve. When the mounting force overcomes the static friction between the mating tapered surfaces the bolt slides into (expanding) the sleeve. In rare occasions, because of the surface texture, the static friction between the surfaces becomes bigger than usual. This means that a greater mounting force is needed to overcome the static friction, and when it does the reaction force causes known bolt arrangements to "jump" and the sleeve may move out of position. In worst case one need to dismount the bolt arrangement and restart the mounting operation from the beginning, until no "jump" moves the sleeve out of position during mounting. With the new proposed design such problems will be avoided due to that the sleeve will be held in a fixed position during mounting thanks to the portion which is in contact with one of the mechanical elements which are coupled together.

Optionally, the portion of the sleeve further extends at least partly in the circumference of the sleeve.

Optionally, the portion of the sleeve is arranged to be in contact with a mating surface of a mechanical element.

Optionally, the portion of the sleeve presents an axial thickness which is equal to 2-10%, or preferably 5-8%, of the diameter of the outer peripheral surface of the sleeve.

Optionally, the portion of the sleeve can alternatively present an axial thickness which is equal to 5-15%, or preferably 8-12%, of the diameter of the outer peripheral surface of the sleeve.

Optionally, the outer diameter of the portion of the sleeve is up to 150% of the hole diameter of the hole into which the sleeve shall be positioned. In a further embodiment, the outer diameter of the portion of the sleeve is up to 130% of the hole diameter of the hole into which the sleeve shall be positioned.

Optionally, the inner peripheral surface of the sleeve further presents a non-tapering profile in its longitudinal direction, whereby the non-tapering profile is located adjacent to the axial end which presents the portion of the sleeve. The tapering profile of the sleeve may extend along the complete extension of the sleeve, but also in an embodiment the tapering profile may extend along a part of the extension of the sleeve. It may be enough to have tapering profile that essentially corresponds to the tapering profile of the bolt. Compared to prior art sleeves, the sleeve of the present disclosure may need to present a greater extension in its longitudinal extension. In an embodiment, the non-tapering profile is a cylindrical profile. The non-tapering profile may also have other shapes, such as a wave-like profile etc. In a further embodiment, in the case when there is a tapering profile that extends along the complete extension of the sleeve inner surface, the tapering profile may taper differently along the extension.

Optionally, the outer peripheral surface of the bolt further presents an external male thread on at least one axial side of the portion of the bolt which presents the tapering profile.

Optionally, the bolt arrangement further comprises at least one nut which presents an internal female thread which is matching the external male thread. In an embodiment, the at least one nut is configured such that the portion of the sleeve can be received in a circumferential groove of the nut.

According to the second aspect, the object is achieved by a coupling arrangement, which comprises, at least one bolt arrangement according to the first aspect of the disclosure, a first mechanical element presenting at least a first hole, the hole being a through-hole, and a second mechanical element presenting at least a second hole. In an alternative embodiment, the second hole is also a through-hole. In a further embodiment, the second hole is a blind hole, which blind hole presents an inlet and a bottom. The first and second holes are aligned and the at least one bolt arrangement is at least partly located in the first and second holes for mechanically fixing the first and second elements together. In addition, the portion of the sleeve is in contact with one of the first or second mechanical elements. It shall be noted that all embodiments of the first aspect are applicable and combinable to all embodiments of the second aspect of the disclosure and vice versa.

Due to the portion (or flange) on the sleeve at one of its axial ends the mounting operation will be facilitated. It has namely been realized that in prior art coupling arrangements there may be situations when the sleeve is not positioned correctly relative the hole in which the bolt arrangement is meant to be located. Most often the bolt arrangement is mounted and positioned in its hole by using hand force and if this procedure is done carelessly it can lead to that the bolt and sleeve are not positioned correctly relative each other. With the new proposed design of the sleeve this can be avoided and therefore the bolt arrangement will be correctly mounted at all times. In addition, the mounting procedure will be done by fewer steps, and with fewer tools, and hence the time for mounting the bolt arrangement will be reduced.

During the mounting operation a tensioner may pull the bolt into (expanding) the sleeve. When the mounting force overcomes the static friction between the mating tapered surfaces the bolt slides into (expanding) the sleeve. In rare occasions, because of the surface texture, the static friction between the surfaces becomes bigger than usual. This means that a greater mounting force is needed to overcome the static friction, and when it does the reaction force causes known bolt arrangements to "jump" and the sleeve may move out of position. In worst case one need to dismount the bolt arrangement and restart the mounting operation from the beginning, until no "jump" moves the sleeve out of position during mounting. With the new proposed design such problems will be avoided due to that the sleeve will be held in a fixed position during mounting thanks to the portion which is in contact with one of the mechanical elements of the coupling arrangement.

Optionally, the portion of the sleeve is in contact with one of the first or second mechanical elements at a surface being adjacent to and encircling the through-hole of the contacting mechanical element.

According to the third aspect of the disclosure, the object is achieved by a method for mounting a coupling arrangement according to the second aspect, wherein a first and a second nut are mounted on respective axial sides of the tapering portion of the bolt via threaded connections. The method comprises the following steps:

1) putting a tool in contact with a surface which presents the through-hole of the mechanical element which is not in contact with the portion of the sleeve, 2) creating a first axial force on the bolt via the tool such that the bolt is axially displaced relative the sleeve and such that the tapering surfaces are driven up on each other and 3) tightening the nuts such that they come in contact with its respective mechanical element.

With the new sleeve design which comprises the above-mentioned portion the mounting procedure can be facilitated and especially it can be made with fewer steps and tools. In prior art bolt arrangements, there is a need of making use of more than one tool to mount the bolt arrangement in its through-hole. First there is a need to make use of a tool that pushes against the sleeve when the bolt is driven into the sleeve such that the sleeve expands. Secondly there is a need to make use of a second tool when preloading the bolt arrangement, which second tool is pushing against a side surface of one of the mechanical elements. With the new proposed design there is no need of a tool that pushes against the sleeve since the portion of the sleeve will locate and hold the sleeve in its correct position during mounting.

Optionally, the method comprises the following steps:

4) further using the tool to preload the bolt arrangement by creating a second force on the bolt such that a friction force is reduced between the nut and the surface of the mechanical element being located at the side where the tool is positioned, and 5) tightening the nut such that an increased friction force between the surfaces is realized. In an alternative embodiment, an axial gap is created when the tool pushes against the surface of the mechanical element, and subsequently the axial gap is eliminated when tightening the nut.

BRIEF DESCRIPTION OF THE DRAWINGS

Exemplifying embodiments of the present disclosure and one example of a prior art bolt arrangement will now be described in more detail, with reference to the accompanying drawings, wherein.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure.

DETAILED DESCRIPTION

Figure 1:
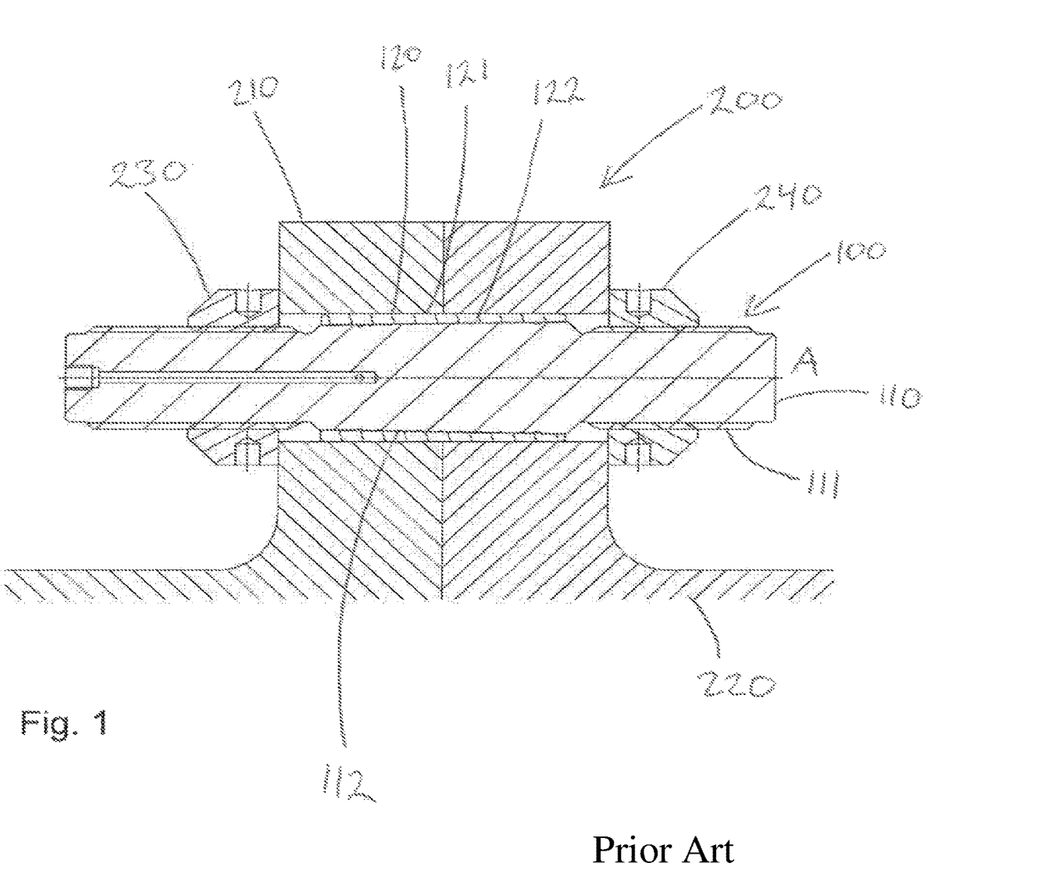
FIG. 1 illustrates a prior art coupling arrangement.

FIG. 1 shows a coupling arrangement 200 as already known in the art. The coupling arrangement comprises a bolt arrangement 100 which is meant for connecting at least two mechanical elements 210 and 220, wherein the bolt arrangement 100 comprises a bolt 110 presenting an outer circumferential peripheral surface 111 extending in a longitudinal direction A of the bolt 110, and a sleeve 120 presenting an outer circumferential peripheral surface 121 and an inner circumferential peripheral surface 122 extending in a longitudinal direction A of the sleeve 120. The inner peripheral surface 122 has a tapering profile in its longitudinal direction A, wherein a portion 112 of the outer peripheral surface 111 of the bolt 110 presents a corresponding tapering profile essentially matching the tapering profile of the inner peripheral surface 122 of the sleeve. The coupling arrangement further comprises two nuts 230 and 240 which are tightened against the respective mechanical elements 210 and 220.

Figure 2:
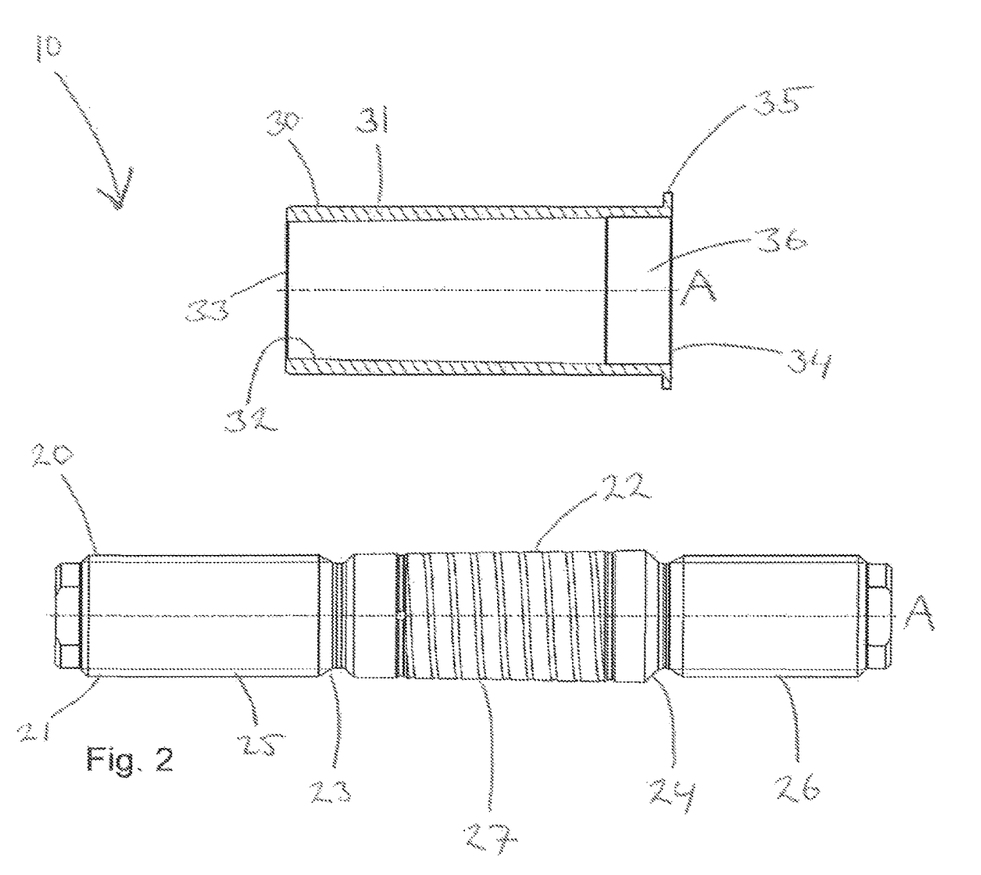
FIG. 2 illustrates a bolt arrangement according to an embodiment of the first aspect of the disclosure.

FIG. 2 shows a bolt arrangement 10 according to an embodiment of the first aspect of the disclosure. The bolt arrangement 10 is meant for connecting at least two mechanical elements (not shown). It comprises a bolt 20 presenting an outer circumferential peripheral surface 21 extending in a longitudinal direction A of the bolt, a sleeve 30 presenting an outer circumferential peripheral surface 31 and an inner circumferential peripheral surface 32 extending in a longitudinal direction A of the sleeve 30 between a first and a second axial end 33 and 34 of the sleeve 30, wherein the inner peripheral surface 32 presents a tapering profile in its longitudinal direction A. A portion 22 of the outer peripheral surface of the bolt 20 presents a corresponding tapering profile essentially matching the tapering profile of the inner peripheral surface 32 of the sleeve 30. In addition, the sleeve 30 further presents a portion 35 extending radially outwards at the second axial end 34. In the shown embodiment, the portion 35 on the sleeve is configured as a flange. Furthermore, the inner peripheral surface 32 of the sleeve 30 further presents a non-tapering profile 36 in its longitudinal direction A, whereby the non-tapering profile 36 is located adjacent to the second axial end 34 which presents the portion 35. In another embodiment the tapering on the inner peripheral surface 32 of the sleeve 30, extend along the complete extension of the sleeve 30. The bolt 20 further presents a first and a second threaded portion 25 and 26 on each axial side of the portion 22 which presents the tapering profile. The threaded portions 25 and 26 are meant to receive nuts (not shown) with corresponding female threads. In addition, in this embodiment, the bolt 20 also presents a groove 27 for receiving a fluid, which is meant to facilitate dismounting of the bolt arrangement 10. Between the threaded portion 25 and the tapered profile 22 is a waist portion 23 located, and between the threaded portion 26 and the tapered profile 22 is another waist portion 24 located. In another embodiment, there are no waist portions on the bolt 20.

Figure 3:
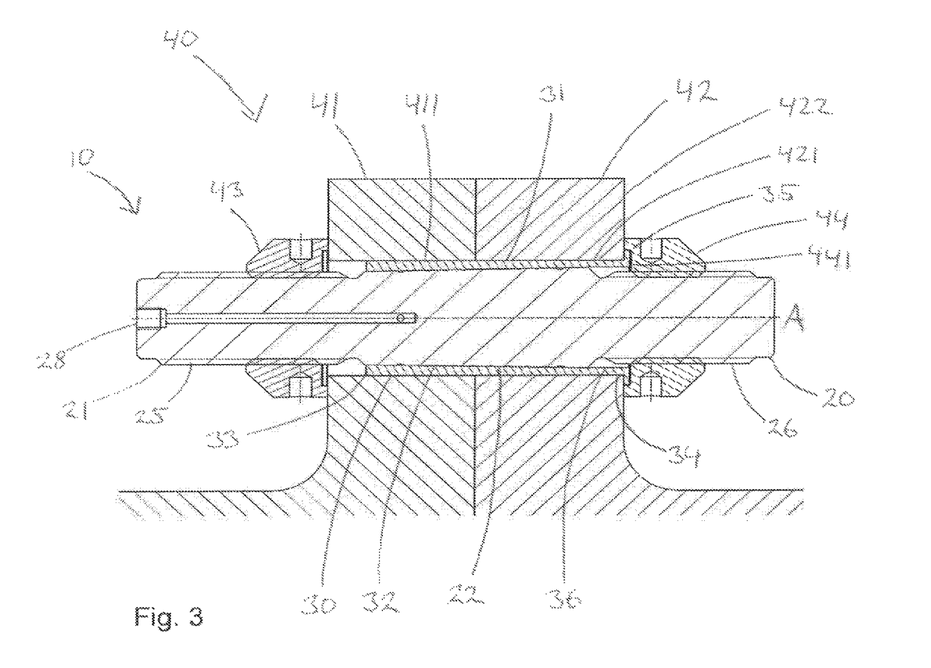
FIG. 3 illustrates a coupling arrangement according to an embodiment of the second aspect of the disclosure.

In FIG. 3, a coupling arrangement 40 according to an embodiment of the second aspect of the disclosure can be seen. The coupling arrangement 40 comprises at least one bolt arrangement 10 according to the first aspect if the disclosure, a first mechanical element 41 presenting at least a first through-hole 411 and a second mechanical element 42 presenting at least a second through-hole 421. The bolt arrangement 10 comprises a bolt 20 presenting an outer circumferential peripheral surface 21 extending in a longitudinal direction A of the bolt 20, a sleeve 30 presenting an outer circumferential peripheral surface 31 and an inner circumferential peripheral surface 32 extending in a longitudinal direction A of the sleeve 30 between a first and a second axial end 33 and 34 of the sleeve 30, wherein the inner peripheral surface 32 presents a tapering profile in its longitudinal direction A. A portion 22 of the outer peripheral surface of the bolt 20 presents a corresponding tapering profile essentially matching the tapering profile of the inner peripheral surface 32 of the sleeve 30. In addition, the sleeve 30 further presents a portion 35 extending radially outwards at the second axial end 34. In the shown embodiment, the portion 35 on the sleeve is configured as a flange which extends in the circumferential direction of the sleeve 30 and encircles the bolt 20. Furthermore in this embodiment, the inner peripheral surface 32 of the sleeve 30 further presents a non-tapering profile 36 in its longitudinal direction A, whereby the non-tapering profile 36 is located adjacent to the second axial end 34 which presents the portion 35. The bolt further presents a first and a second threaded portion 25 and 26 on each axial side of the portion 22 which presents the tapering profile. The threaded portions 25 and 26 receive nuts 43 and 44 with corresponding female threads. As can be seen, the portion 35 of the sleeve 30 is arranged such that it is in contact with the axial side face surface 422 of the second mechanical element 42, thus assuring that the sleeve 30 will be located in a fixed predetermined position during the mounting procedure of the bolt arrangement 10. The corresponding nut 44 is arranged such that the portion 35 of the sleeve 30 is located in a circumferential groove 441 of the nut, which groove is encircling the bolt 20. With the shown design, the nut 44 can be securely tightened against the axial side surface 422 of the second mechanical element 42. The first and second through-holes 411 and 421 are aligned and the at least one bolt arrangement 10 is at least partly located in the first and second through-holes 411 and 421 for mechanically fixing the first and second elements 41 and 42 together. The fixing of the elements 41 and 42 is accomplished due to the radial expansion of the sleeve since the bolt 20 has been driven in to the sleeve 30, and also the nuts 41 and 42 are tightened against the side surfaces of the mechanical elements 41 and 42. Further, in this embodiment, a fluid channel 28 can be seen. The channel is used for introducing a fluid, such as oil, between the mating surfaces 22 and 32 during dismounting of the bolt arrangement 10.

Figure 4:
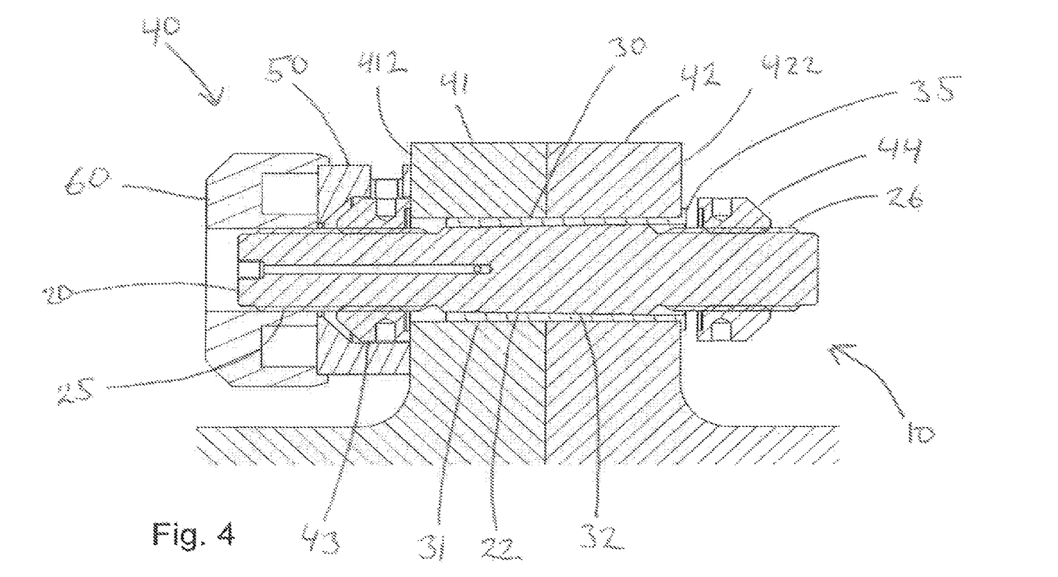
FIG. 4 illustrates a coupling arrangement according to an embodiment of the second aspect of the disclosure during a mounting procedure according to the third aspect of the disclosure.

FIG. 4 shows an embodiment of a coupling arrangement 40 according to the second aspect of the disclosure, wherein a tool 50 is located around the first threaded portion 25 of the bolt 20. The tool 50 is in this embodiment in the form of a sleeve that encircles the nut 43 and pushes against the axial side surface 412 of the first mechanical element 41. Axially outside the tool 50 is a hydraulic tensioner 60 mounted and fixated via the threaded connection 25, which tensioner 60 is arranged to press against the tool 50 such that the bolt 20 will be driven into the sleeve 30 and thereby result in a radial expansion of the sleeve 30. In this phase of the mounting procedure according to the third aspect of the disclosure, there is an axial gap between the nut 44 and the axial side face surface 422 of the second mechanical element 42. The portion 35 of the sleeve will hold the sleeve 30 in a predetermined fixed position during this phase of the mounting procedure. Thus, there is no need of a separate tool that holds the sleeve 30 in the correct position during the radial expansion of the sleeve 30. Further explanation of reference numerals in FIG. 4 not mentioned in this section can be found in the detailed description accompanying e.g. FIGS. 2 and 3.

Figure 5:
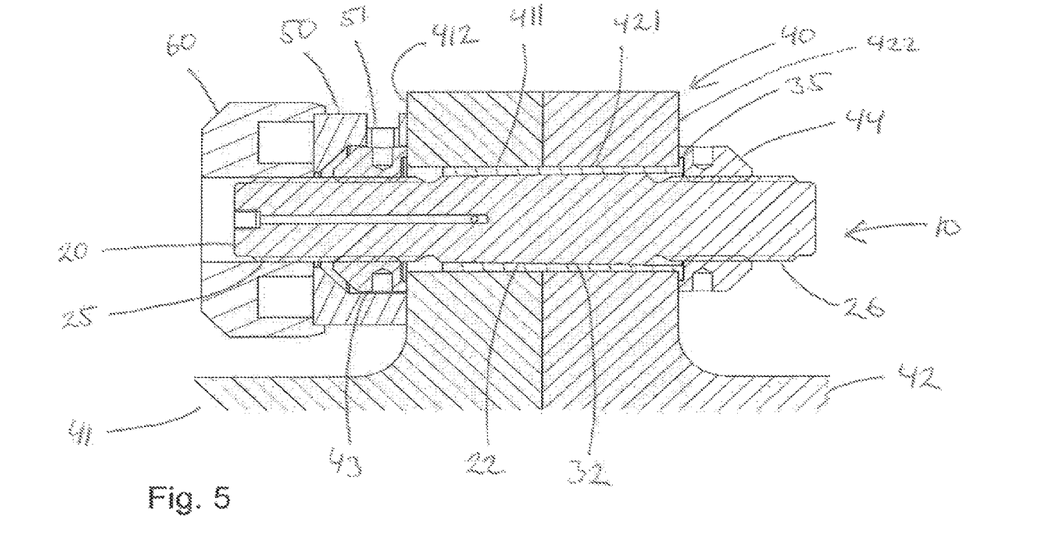
FIG. 5 illustrates a coupling arrangement according to an embodiment of the second aspect of the disclosure during a mounting procedure according to the third aspect of the disclosure.

FIG. 5 shows an embodiment of a coupling arrangement 40 according to the second aspect of the disclosure, wherein a tool 50 is located around the first threaded portion 25 of the bolt 20. The tool 50 in FIG. 5 may be the same tool 50 as shown in FIG. 4. In this view, other subsequent steps of the mounting procedure according to the third aspect of the disclosure will be further explained. In this phase, the sleeve 30 has been radially expanded in the through-holes 411 and 421 and now the bolt arrangement is intended to be preloaded by further tightening the nuts 43 and 44. Again, the tool 50 will push against the surface 412 of the first mechanical element 41 when the tensioner 60 is pushing against the tool 50. When this is done the nut 43 can be further tightened via a radial opening 51 of the tool 50, and thereby a certain preload can be accomplished. The sleeve 35 of the portion is again assuring that the sleeve is kept in position. With this specific design it is thus possible to perform the radial expansion and the preloading of the bolt arrangement 10 without any additional tool. Further explanation of reference numerals in FIG. 5 not mentioned in this section can be found in the detailed description accompanying e.g. FIGS. 2 and 3.

Figure 6:
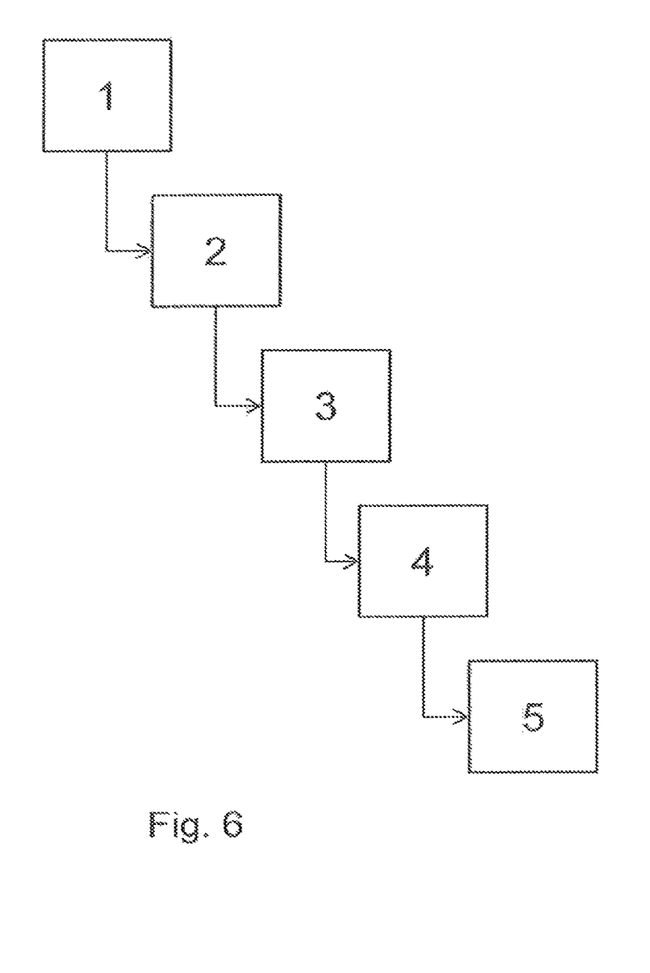
FIG. 6 illustrates a method according to an embodiment of the third aspect of the disclosure.

FIG. 6 shows an embodiment of the method according to the third aspect of the disclosure. In this embodiment, the method comprises five subsequent steps. A method for mounting a coupling arrangement according to the second aspect can be seen, wherein a first and a second nut are mounted on respective axial sides of the tapering portion of the bolt via threaded connections. The method comprises the following steps:

1) putting a tool in contact with a surface which presents the through-hole of the mechanical element which is not in contact with the portion of the sleeve, 2) creating a first axial force on the bolt via the tool such that the bolt is axially displaced relative the sleeve and such that the tapering surfaces are driven up on each other, and 3) tightening the nuts such that they come in contact with its respective mechanical element. The method in this embodiment further comprises the steps:

4) further using the tool to preload the bolt arrangement by creating a second force on the bolt such that a friction force between the nut and the surface of the mechanical element being located at the side where the tool is positioned is reduced, and 5) tightening the nut such that an increased friction force between the nut and mechanical element is realized. In an embodiment of the method, an axial gap is created when the tool is pushing against the surface, and subsequently the nut is tightened such that the axial gap is eliminated.

Figure 7:
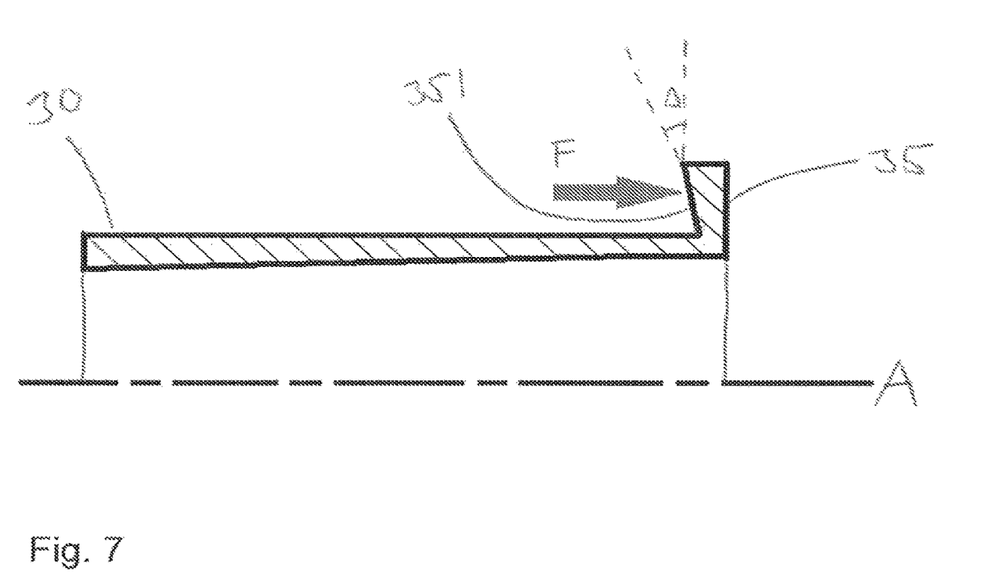
FIG. 7 shows a cross section of a sleeve according to an embodiment of the disclosure.

In FIG. 7, a cross sectional view of a sleeve 30 according to an embodiment of the disclosure can be seen. In the drawing it can be seen that the portion 35 (in this case configured as a flange) presents on its axially inner side an axially inner side surface 351 which is angled relative a radial direction of the portion 35. The side surface 351, which is the surface which is meant to be in contact with the corresponding surface 422 of the mechanical element 42 (not shown in this figure), is angled by an angle Δ out from the portion 35 and towards the surface which it is intended to be in contact with, i.e. the side surface of the corresponding mechanical element. Due to the forces F created when the bolt arrangement is mounted, the side surface 351 angle Δ may be reduced such that the surface attains an angle Δ being essentially vertical and in the radial direction of the portion 35 after mounting. This may lead to an improved connection of the bolt arrangement including the sleeve 30, i.e. it may lead to a more even distribution of the forces acting on the surface 351. By calculating and predicting the forces that will act on the sleeve surface 351 the angle Δ of the surface 351 can be tailored to optimize the distribution of the load on the surface. In an alternative embodiment, the side surface 351 presents an angle Δ which is essentially vertical and in the radial direction of the portion 35.

The invention is not limited to the embodiments and advantages as described and illustrated in this disclosure, but other embodiments and also modifications to the embodiments described are possible within the scope of the claims.

What is claimed is:

1. A bolt arrangement for connecting at least two mechanical elements which combine to form a common bore therethrough, the common bore having a common bore length, the bolt arrangement comprising:

a first mechanical element;

a second mechanical element, the common bore extending through the first and second mechanical elements;

a bolt having an outer circumferential peripheral surface extending in a longitudinal direction of the bolt, a sleeve having an outer circumferential peripheral surface and an inner circumferential peripheral surface extending in a longitudinal direction of the sleeve between a first and a second axial end of the sleeve, the sleeve having a length as measured between the first and second axial ends thereof, the first axial end being a free end and the second axial end having a flange thereon, the flange extending radially outwardly therefrom, the length of the sleeve being less than the common bore length and longer than an axial width of the first mechanical element as measured along the common bore length such that the sleeve axially overlaps all of the first mechanical element and partially axially overlaps the second mechanical element, the sleeve and flange being a one-piece, unitary member wherein the inner peripheral surface has at least a tapering profile in its longitudinal direction, wherein a portion of the outer peripheral surface of the bolt provides a corresponding tapering profile matching the tapering profile of the inner peripheral surface of the sleeve, wherein the first mechanical element has an outwardly facing, outermost, axial end which forms a radially extending axial surface, the flange being axially outside of the common bore and axially abutting at least a portion of the radially extending axial surface, and a first nut engaged with the bolt and abutting the radially extending axial surface of the first mechanical element, the first nut having a recess for receiving the flange of the sleeve therein, a second nut engaged with the bolt and abutting the second mechanical element such that the first nut and the second nut prevent axial separation of the first mechanical element and such that the first nut and the first mechanical element enclose the flange of the sleeve.

2. The bolt arrangement according to claim 1, wherein the flange of the sleeve further extends at least partly in the circumference of the sleeve.

3. The bolt arrangement according to claim 1, wherein the inner peripheral surface of the sleeve further provides a non-tapering profile in its longitudinal direction, and wherein the non-tapering profile is located adjacent to the second axial end.

4. The bolt arrangement according to claim 3, wherein the non-tapering profile is a cylindrical profile.

5. The bolt arrangement according to claim 1, wherein the outer peripheral surface of the bolt further provides an external male thread,
wherein the external male thread is disposed on at least one axial side of the portion of the bolt that provides the tapering profile.

6. The bolt arrangement according to claim 5, wherein the first nut and the second nut each include an internal female thread that matches the external male thread.

7. The bolt arrangement according to claim 1, wherein the bolt comprises a fluid channel configured to introduce a fluid between the portion of the outer peripheral surface of the bolt and the inner peripheral surface of the sleeve.

8. A bolt arrangement for connecting at least two mechanical elements which combine to form a common bore therethrough, the common bore having a common bore length, the bolt arrangement comprising:
a first mechanical element;
a second mechanical element, the common bore extending through the first and second mechanical elements;
a bolt having an outer circumferential peripheral surface extending in a longitudinal direction of the bolt,
a sleeve having an outer circumferential peripheral surface and an inner circumferential peripheral surface extending in a longitudinal direction of the sleeve between a first and a second axial end of the sleeve, the sleeve having a length as measured between the first and second axial ends thereof, the first axial end being a free end and the second axial end having a flange thereon, the flange extending radially outwardly therefrom, the length of the sleeve being less than the common bore length and longer than an axial width of the first mechanical element as measured along the common bore length such that the sleeve axially overlaps all of the first mechanical element and partially axially overlaps the second mechanical element, the sleeve and flange being a one-piece, unitary member,
wherein the inner peripheral surface has at least a tapering profile in its longitudinal direction such that the first axial end has a first radial thickness which is greater than a second radial thickness of the second axial end,
wherein a portion of the outer peripheral surface of the bolt provides a corresponding tapering profile matching the tapering profile of the inner peripheral surface of the sleeve,
wherein the first mechanical element has an outwardly facing, outermost, axial end which forms a radially extending axial surface, the flange being axially outside of the common bore and axially abutting at least a portion of the radially extending axial surface,
wherein the first axial end of the sleeve is a free end which defines a side of a gap, and
a first nut engaged with the bolt and abutting the radially extending axial surface of the first mechanical element, the first nut having a recess for receiving the flange of the sleeve therein,
a second nut engaged with the bolt and abutting the second mechanical element such that the first nut and the second nut prevent axial separation of the first mechanical element and such that the first nut and the first mechanical element enclose the flange of the sleeve.

9. A bolt arrangement for connecting at least two mechanical elements which combine to form a common bore through the at least two mechanical elements, the common bore having a common bore length, the bolt arrangement comprising:
a first mechanical element;
a second mechanical element, the common bore extending through the first and second mechanical elements;
a bolt having an outer circumferential peripheral surface extending in a longitudinal direction of the bolt,
a sleeve having an outer circumferential peripheral surface and an inner circumferential peripheral surface extending in a longitudinal direction of the sleeve between a first and a second axial end of the sleeve, the sleeve having a length as measured between the first and second axial ends thereof, the first axial end being a free end and the second axial end having a flange thereon, the flange extending radially outwardly therefrom, the length of the sleeve being less than the common bore length and longer than an axial width of the first mechanical element as measured along the common bore length such that the sleeve axially overlaps all of the first mechanical element and partially axially overlaps the second mechanical element, the sleeve and flange being a one-piece, unitary member,
wherein the inner peripheral surface has at least a tapering profile in its longitudinal direction such that the first axial end has a first radial thickness which is greater than a second radial thickness of the second axial end,
wherein a portion of the outer peripheral surface of the bolt provides a corresponding tapering profile matching the tapering profile of the inner peripheral surface of the sleeve,
wherein the first mechanical element has an outwardly facing, outermost, axial end which forms a radially extending axial surface, the flange being axially outside of the common bore and axially abutting at least a portion of the radially extending axial surface,
the flange comprising an axially inner side surface that is angled relative to the longitudinal direction of the bolt to facilitate deflection of the flange when a force is exerted on the bolt in a direction away from the second axial end, and
a first nut engaged with the bolt and abutting the radially extending axial surface of the first mechanical element, the first nut having a recess for receiving the flange of the sleeve therein,
a second nut engaged with the bolt and abutting the second mechanical element such that the first nut and the second nut prevent axial separation of the first mechanical element and such that the first nut and the first mechanical element enclose the flange of the sleeve.

* * * * *